US009285885B2

(12) United States Patent
Lee et al.

(10) Patent No.: US 9,285,885 B2
(45) Date of Patent: Mar. 15, 2016

(54) GESTURE RECOGNITION MODULE AND GESTURE RECOGNITION METHOD

(71) Applicant: Wistron Corporation, New Taipei (TW)

(72) Inventors: Chung-Wei Lee, New Taipei (TW); Chih-Hsuan Lee, New Taipei (TW); Chia-Te Chou, New Taipei (TW); Shou-Te Wei, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 396 days.

(21) Appl. No.: 13/892,320

(22) Filed: May 13, 2013

(65) Prior Publication Data
US 2014/0204015 A1    Jul. 24, 2014

(30) Foreign Application Priority Data

Jan. 23, 2013  (TW) .............................. 102102472 A

(51) Int. Cl.
*G06F 3/01*    (2006.01)
*G06F 3/03*    (2006.01)
*G06K 9/00*    (2006.01)
(52) U.S. Cl.
CPC .............. *G06F 3/017* (2013.01); *G06F 3/0304* (2013.01); *G06K 9/00375* (2013.01)
(58) Field of Classification Search
CPC ............................ G06F 3/017; G06F 17/30032
See application file for complete search history.

(56) References Cited

U.S. PATENT DOCUMENTS

| 8,339,359 | B2 | 12/2012 | Hsieh | |
|---|---|---|---|---|
| 2002/0126090 | A1* | 9/2002 | Kirkpatrick et al. | 345/158 |
| 2011/0175802 | A1* | 7/2011 | Hsieh et al. | 345/156 |
| 2013/0120250 | A1* | 5/2013 | Lin et al. | 345/157 |
| 2014/0104168 | A1* | 4/2014 | Hegde | 345/157 |

FOREIGN PATENT DOCUMENTS

TW    201120681    6/2011

OTHER PUBLICATIONS

Office action mailed on Oct. 20, 2014 for the Taiwan application No. 102102472, filing date: Jan. 23, 2013, p. 1 line 12-14, p. 2-3 line 1-3 and line 6-26, p. 5 and p. 6 line 1-9.

* cited by examiner

*Primary Examiner* — Kent Chang
*Assistant Examiner* — Chayce Bibbee
(74) *Attorney, Agent, or Firm* — Winston Hsu; Scott Margo

(57) ABSTRACT

A gesture recognition module, for recognizing a gesture of a user, includes a detecting unit, for capturing at least one hand image of a hand of the user, so as to sequentially acquire a first coordinate and a second coordinate; a computing unit, coupled to the detecting unit for defining a first zone and a second zone according to the first coordinate and the second coordinate, respectively, and calculating a first area and a second area according to the first zone and the second zone; and a determining unit, coupled to the detecting unit and the computing unit for recognizing the gesture according to the first coordinate, the second coordinate, the first area and the second area.

22 Claims, 8 Drawing Sheets

GESTURE RECOGNITION MODULE AND GESTURE RECOGNITION METHOD

BACKGROUND OF THE INVENTION

1. Field of the Invention

The present application relates to a gesture recognition module and a gesture recognition method, and more particularly, to a gesture recognition module and a gesture recognition method capable of accurately recognizing whether a hand of a user performs a grabbing gesture.

2. Description of the Prior Art

Electronic devices may utilize three dimensional (3D) images or two dimensional (2D) images to recognize gestures of a user. In comparison with the 2D images, the 3D images comprise depth information. When the electronic devices utilize the 3D images for recognizing gestures, the electronic devices can use the depth information to exclude unnecessary image information, which increases the accuracy of recognizing the gestures. Since the details of 3D images are fuzzier than those of 2D images, however, it is difficult for an electronic device to use 3D images as references when recognizing gestures. For example, when an electronic device captures images of a user's fist, the greater clarity of the 2D images can show details such as the fingers of the user whereas the 3D images can only show the shape of the fist. Thus, if the ability of the electronic device to recognize details in a 3D image can be improved, the accuracy of using 3D images to recognize the gestures of a user can be increased.

SUMMARY OF THE INVENTION

The present application discloses a gesture recognition module and a gesture recognition method capable of recognizing gestures of a user via calculating area variations of the user's hand in 3D images.

The present invention discloses a gesture recognition module, for recognizing a gesture of a user, comprising: a detecting unit, for capturing at least one image of a hand of the user, so as to sequentially acquire a first coordinate and a second coordinate; a computing unit, coupled to the detecting unit for defining a first zone and a second zone according to the first coordinate and the second coordinate, respectively, and calculating a first area and a second area according to the first zone and the second zone; and a determining unit, coupled to the detecting unit and the computing unit for recognizing the gesture according to the first coordinate, the second coordinate, the first area and the second area.

The present invention further discloses a gesture recognition method for a gesture recognition module, comprising: capturing at least one image of a hand of the user, to sequentially acquire a first coordinate and a second coordinate; defining a first zone and a second zone according to the first coordinate and the second coordinate; calculating a first area and a second area according to the first zone and the second zone; and recognizing the gesture according to the first coordinate, the second coordinate, the first area and the second area.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
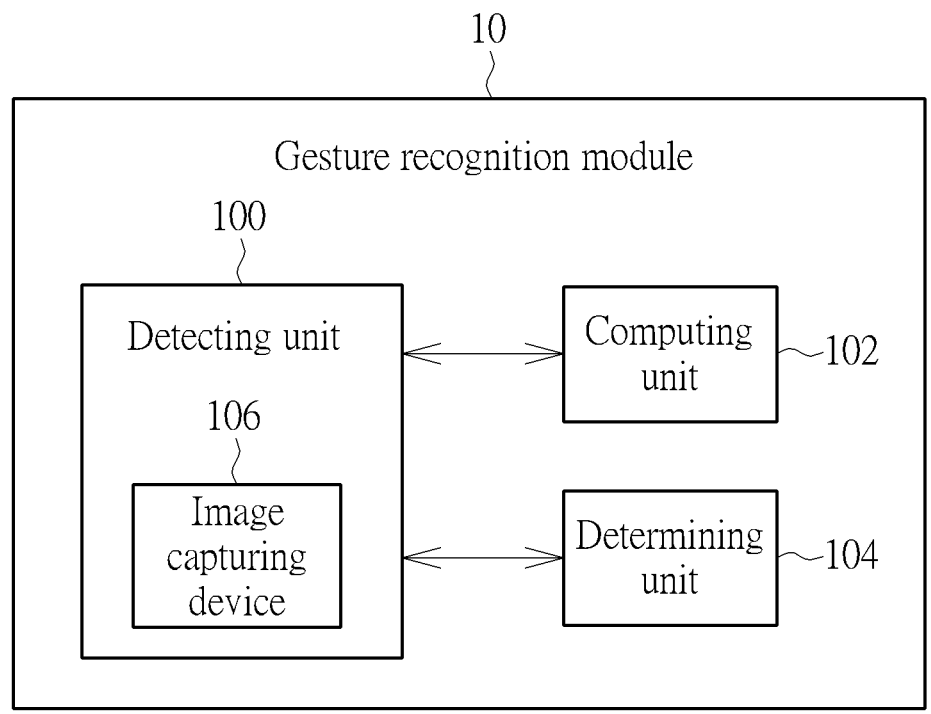
FIG. 1 is a schematic diagram of a gesture recognition module according to an embodiment of the present invention.

Please refer to FIG. 1, which is a schematic diagram of a gesture recognition module 10 according to an embodiment of the present invention. The gesture recognition module 10 is utilized for recognizing gesture of a user according to 3D images. As shown in FIG. 1, the gesture recognition module 10 comprises a detecting unit 100, a computing unit 102 and a determining unit 104. The detecting unit 100 comprises at least one image capturing device 106 for capturing at least one hand image of the hand of the user, to sequentially acquire coordinates HC_1, HC_2. The coordinates HC_1, HC_2 may be absolute coordinates of the hand or relative coordinates of the hand images. The computing unit 102 is coupled to the detecting unit 100 for defining zones HZ_1, HZ_2 according to the coordinates HC_1, HC_2, respectively, and calculating areas HA_1, HA_2 according to the zones HZ_1, HZ_2. The determining unit 104 is coupled to the detecting unit 100 and the computing unit 102 for determining the gesture of the user according to the coordinates HC_1, HC_2 and the areas HA_1, HA_2. In brief, after the detecting unit 100 detects the coordinates HC_1, HC_2 of the hand of the user (or of the image of the hand), the computing unit 102 calculates the areas HA_1, HA_2 according to the coordinates HC_1, HC_2. The determining unit 104 then recognizes the gesture of the user according to a variation between the coordinates HC_1, HC_2 and a variation between the areas HA_1, HA_2.

Please note that, the gesture recognition module 10 shown in FIG. 1 is merely used for better illustrating the present invention, but the invention is not limited herein. In practical, the detecting unit 100, the computing unit 102 and the determining unit 104 can be integrated as a single gesture recognition unit; for example, a gesture recognition chip. The gesture recognition module 10 can be coupled to any device such as a mouse, a keyboard, a set-top box, a motion sensing input device, a handheld device (e.g. mobile device), a liquid crystal display (LCD) television (TV), a smart TV, etc. A predetermined command can be triggered according to a recognition result, and the device can be controlled accordingly.

Figure 2:
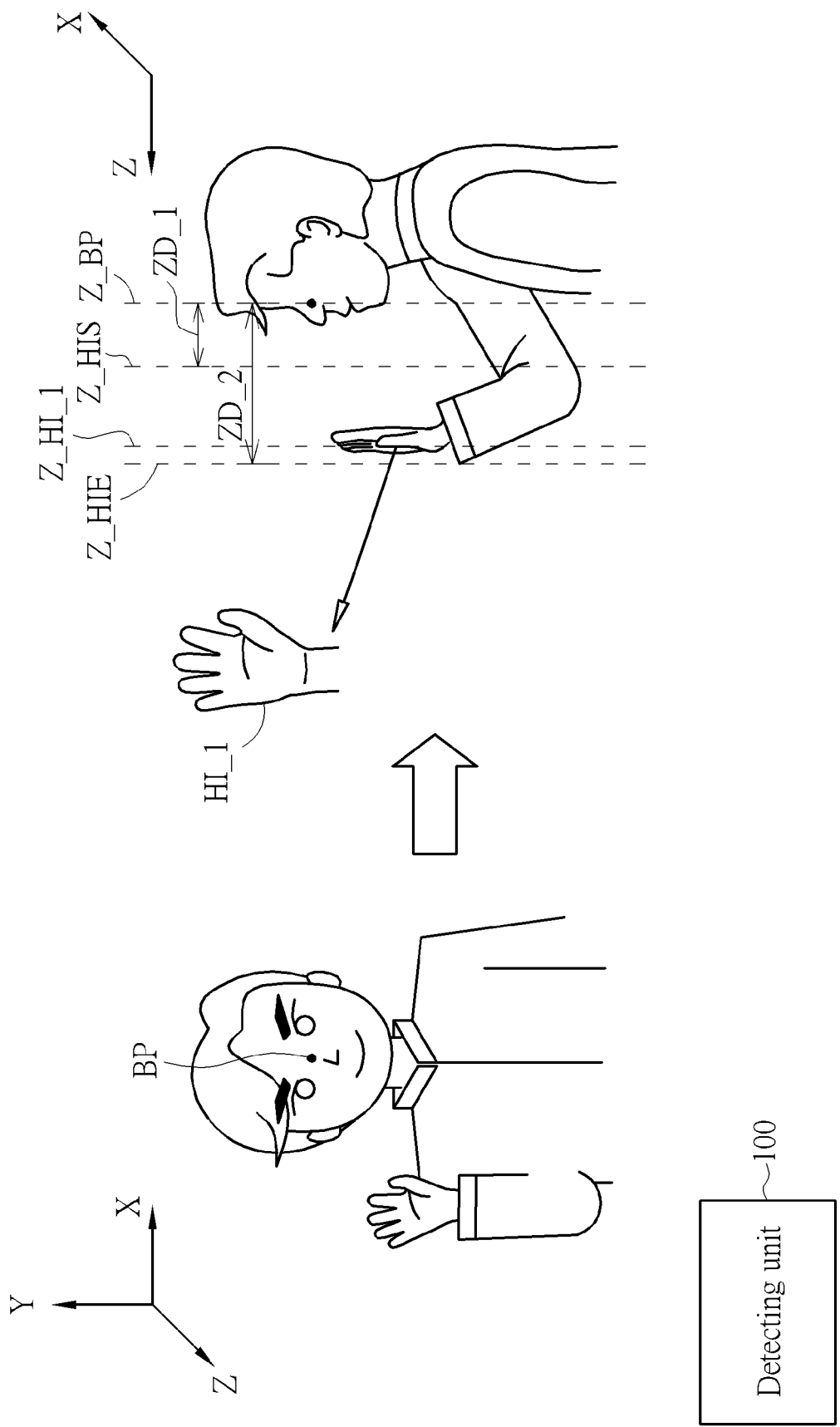
FIG. 2 is a schematic diagram of a gesture of a user according to an embodiment of the present invention.

Please refer to FIG. 2, which is a schematic diagram of a gesture of the user according to an embodiment of the present invention. In FIG. 2, the user is located at the front of the gesture recognition module 10 (but is not limited to be being located directly in front of the gesture recognition module 10), then raises their right arm, and opens their right hand. The detecting unit 100 first captures a 2D image and a 3D image of the user's face for acquiring a face coordinate BP according to the 2D image of the face. The face coordinate BP may be the center of the face or the barycentre of the face, but is not limited herein. Next, the detecting unit 100 acquires a Z-axis (depth) coordinate Z_BP of the face coordinate BP via comparing the 2D image and the 3D image of the face. Since the user's hand is usually located at a specific range from their face (e.g. a range from 5 cm to 50 cm in front of the face), the detecting unit 100 subtracts a depth ZD1 and a depth ZD2 from the Z-axis coordinate Z_BP, respectively, for acquiring a hand image start coordinate Z_HIS and a hand image end coordinate Z_HIE. The detecting unit 100 then searches an appropriate pixel area from a plurality of pixel areas corresponding to a plurality of Z-axis coordinates from the hand image start coordinate Z_HIS to the hand image end coordinate Z_HIE as a hand image HI_1. For example, the detecting unit 100 excludes pixel areas having areas smaller than an area threshold, for avoiding noise interference, and selects the pixel area with the maximum area (e.g. the pixel area of the Z-axis Z_HI_1 shown in FIG. 2) as the hand image HI_1.

Figure 3:
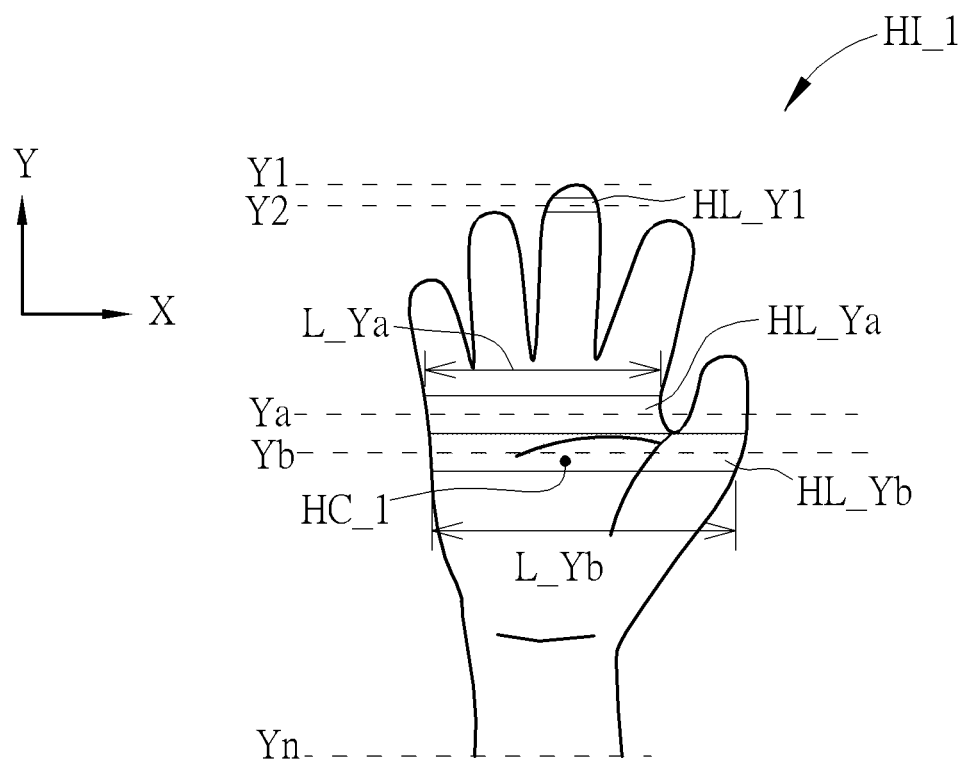
FIG. 3 is a schematic diagram of a hand image according to an embodiment of the present invention.

According to the above procedures, the detecting unit 100 acquires the hand images HI_1, HI_2, sequentially. The detecting unit 100 acquires the coordinates HC_1, HC_2 according to the hand images HI_1, HI_2. According to different applications, there can be various methods of the detecting unit 100 acquiring the coordinates HC_1, HC_2 according to the hand images HI_1, HI_2. Please refer to FIG. 3, which is a schematic diagram of the hand image HI_1 according to an embodiment of the present invention. As shown in FIG. 3, the hand image HI_1 is located between the Y-axis (vertical) coordinates Y1-Yn. The detecting unit 100 acquires horizontal lines HL_Y1-HL_Yn corresponding to the Y-axis coordinates Y1-Yn, respectively, and lengths L_Y1-L_Yn of the horizontal lines HL_Y1-HL_Yn, wherein if a single Y-axis coordinate corresponds to a plurality of horizontal lines, the detecting unit 100 selects the horizontal line having the maximum length as the horizontal line corresponding to the single Y-axis coordinate. The detecting unit 100 compares lengths corresponding to two contiguous Y-axis coordinates among the Y-axis coordinates Y1-Yn, for acquiring a junction between fingers and the palm in the hand image HI_1. When a length L_Ya (corresponding to the Y-axis coordinate Ya) is smaller than a length L_Yb (corresponding to the Y-axis coordinate Yb) by a length threshold TH_L1 (i.e. L_Ya+TH_L1<L_Yb), the variation between the lengths of the Y-axis coordinate Ya and the Y-axis coordinate Yb is greater than the length threshold TH_L1. In such a condition, the detecting unit 100 determines the Y-axis coordinate Yb is at the junction between the fingers and the palm in the hand image HI_1 and acquires the Y-axis coordinate Yb as a Y-axis coordinate of the coordinate HC_1. The detecting unit 100 further acquires an X-axis (horizontal) coordinate of the center point of the horizontal line HL_Yb as an X-axis coordinate of the coordinate HC_1 and acquires the Z-axis coordinate of the hand image HI_1 as a Z-axis coordinate of the coordinate HC_1. According to the above procedures, the detecting unit 100 sequentially obtains the coordinates HC_1, HC_2 according to the hand images HI_1, HI_2, wherein the X-axis coordinates, the Y-axis coordinates and the Z-axis coordinates of the coordinates HC_1, HC_2 are (X_HC_1, Y_HC_1, Z_HC_1) and (X_HC_2, Y_HC_2, Z_HC_2), respectively.

Figure 4A:
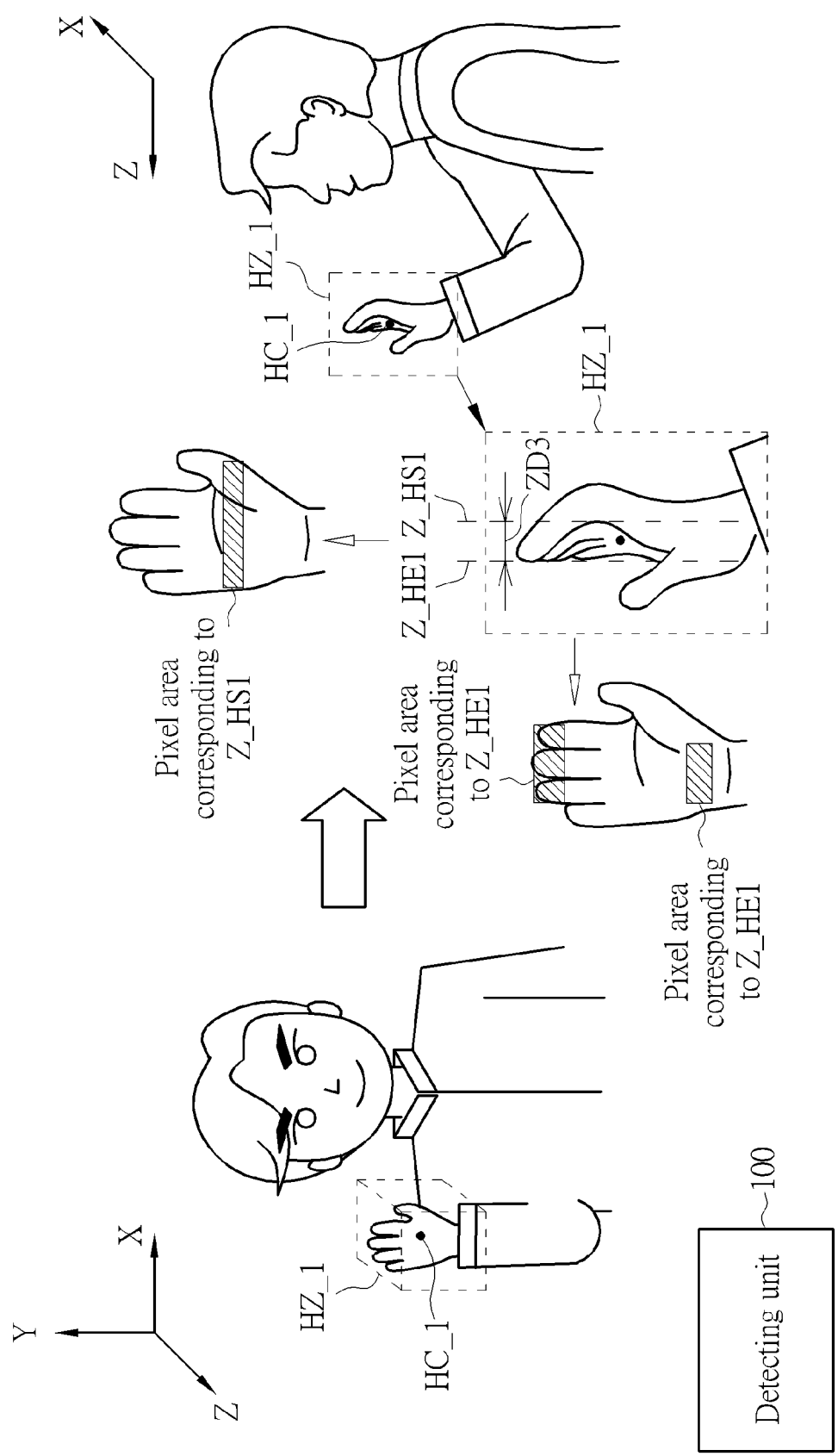
FIG. 4A and FIG. 4B are schematic diagrams of gestures of the user according to embodiments of the present invention.
Figure 4B:
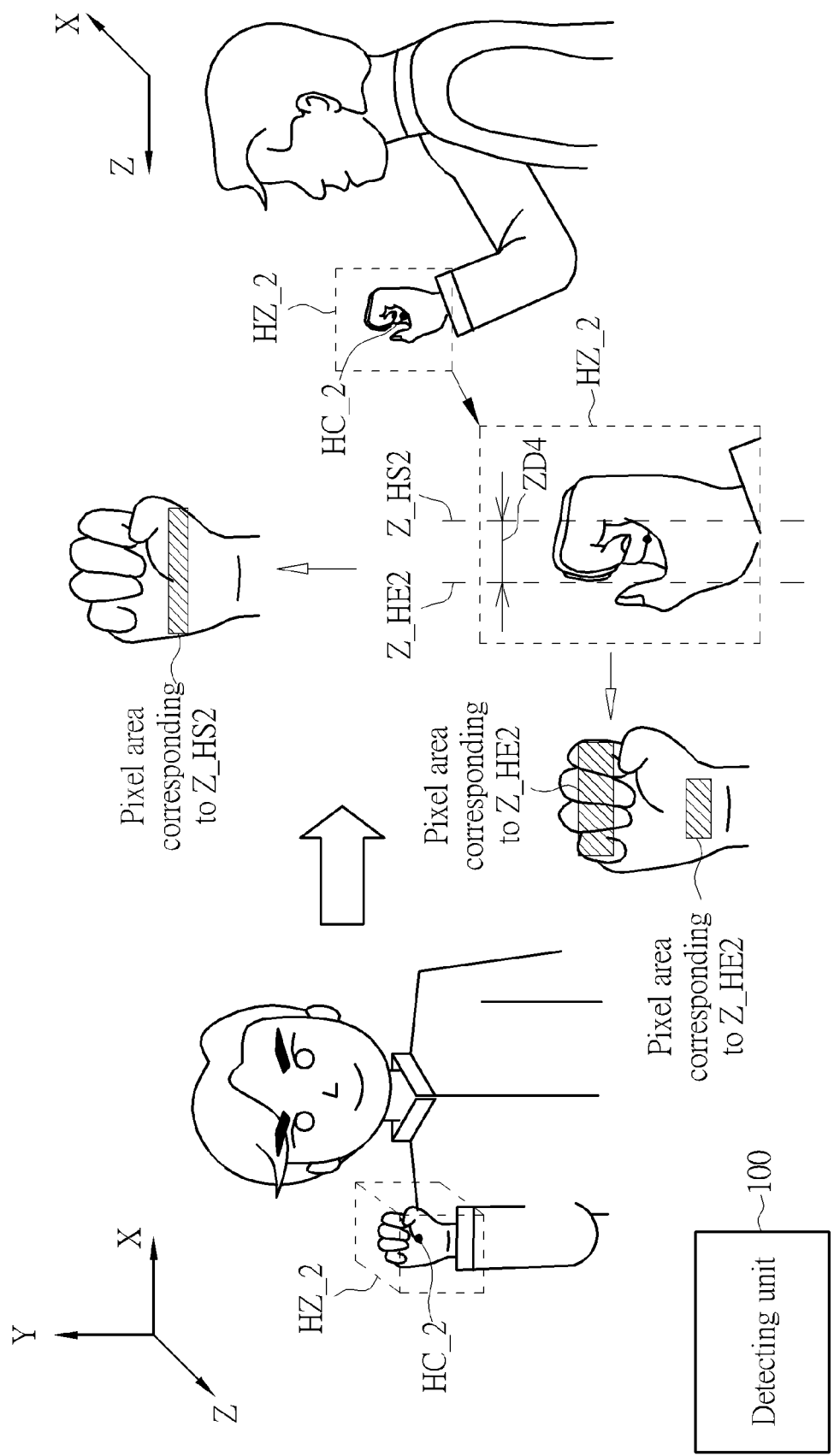

Next, since the hand of the user may be slightly curved, the computing unit 102 defines zones having volumes slightly greater than the hand of the user according to the coordinates HC_1, HC_2 as the zones HZ_1, HZ_2, for acquiring accurate hand areas via accumulating the areas of all pixel areas in the zones HZ_1, HZ_2. Please refer to FIG. 4A and FIG. 4B, which are schematic diagrams of gestures according to embodiments of the present invention. In FIG. 4A, the user raises their right arm and opens their right hand. In FIG. 4B, the user raises their right arm and closes their hand. As shown in FIG. 4A, the computing unit 102 defines a space surrounding the coordinate HC_1 as the zone HZ_1. The X-axis range, the Y-axis range and the Z-axis range of the zone HZ_1 are (X_HC_1−α, X_HC_1+β), (Y_HC_1−γ, Y_HC_1+δ) and (Z_HC_1−ϵ, Z_HC_1+ζ), wherein the α, β, γ, δ, ϵ and ζ are predetermined values. Please note that, the size of the hand captured by the gesture recognition module 10 varies with the Z-axis coordinate Z_HC_1 of the coordinate HC_1. When the Z-axis coordinate Z_HC_1 is smaller, the size of the hand captured by the gesture recognition module 10 is greater. Thus, the volume of the zone HZ_1 should vary with the Z-axis coordinate Z_HC_1. For example, when the Z-axis coordinate Z_HC_1 is decreased by a length L (i.e. the Z-axis coordinate Z_HC_1 becomes smaller), the X-axis range and the Y-axis range of the zone HZ_1 are changed to (X_HC_1−(α+m), X_HC_1+(β+m)) and (Y_HC_1−(γ+m), Y_HC_1+(δ+m)), wherein m is proportional to the length L. In other words, the X-axis range and the Y-axis range of the zone HZ_1 (i.e. the area of the zone HZ_1 in X-Y plane) and the volume of the zone HZ_1 are inversely proportional to the Z-axis coordinate Z_HC_1. Since the images in Z-axis coordinate are not effected by the Z-axis coordinate Z_HC_1, the Z-axis range of the zone HZ_1 remains (Z_HC_1−ϵ, Z_HC_1+ζ) even if the Z-axis coordinate Z_HC_1 is decreased by the length L.

According to the zone HZ_1, the computing unit 102 acquires a hand start coordinate Z_HS1 by acquiring the minimum Z-axis coordinate among the plurality of pixel areas in the zone HZ_1. The computing unit 102 then adds the hand start coordinate Z_HS_1 and a depth Z_D3, to acquire a hand end coordinate Z_HE1, wherein the depth Z_D3 is a predetermined value. Each Z-axis coordinate between the hand start coordinate Z_HS1 and the hand end coordinate Z_HE1 may correspond to at least one pixel area. For example, the pixel area corresponding to the hand start coordinate Z_HS1 may be a rectangular area in the middle of the palm, and the pixel areas corresponding to the hand end coordinate Z_HE1 may be the two rectangular areas on the top side and the bottom side of the hand. Via accumulating the pixel areas corresponding to all the Z-axis coordinates located between the hand start coordinate Z_HS1 and the hand end coordinate Z_HE1, the computing unit 102 acquires the area HA_1 corresponding to the coordinate HC_1. Please refer to FIG. 4B. The computing unit 102 acquires the area HA_2 corresponding to the coordinate HC_2 according to the above procedures.

After obtaining the coordinates HC_1, HC_2 and areas HA_1, HA_2, the determining unit 104 recognizes the gesture of the user according to the variation between the coordinates HC_1, HC_2 and the variation between the areas HA_1, HA_2. In order to avoid slight shaking of the hand affecting the accuracy of the determining unit 104, the determining unit 104 compares the area HA_1 and the area HA_2 when a distance between the coordinate HC_1 and the coordinate HC_2 is smaller than a moving threshold TH_M (i.e. |HC1−HC2|<TH_M), for determining whether the user performs a grabbing gesture. As can be seen from FIG. 4A and FIG. 4B, when the user opens their hand in FIG. 4A and closes their hand in FIG. 4B, the area HA_1 is greater than area HA_2 (e.g. HA_1×60%=HA_2), which represents the gesture of the user changing from an opening hand to a closing hand. In other words, when the difference between the area HA_1 and the area HA_2 is greater than a grabbing threshold TH_G (i.e. HA_1 −HA_2>TH_G), the determining unit 104 determines the user's hand switches from an open position to a closed position (i.e. the user performs the grabbing gesture). In brief, when the distance between the coordinate HC_1 and the coordinate HC_2 is smaller than the moving threshold TH_M and the difference between the area HA_1 and the area HA_2 is greater than the grabbing threshold TH_G, the determining unit 104 determines the hand of the user switches from an open position to a closed position at the current position of the hand and decides the user performs the grabbing gesture at the current position of the hand. As a result, the gesture recognition module 10 precisely determines whether the gesture of the user is the grabbing gesture according to the variations between the areas of the hand in the hand images.

Figure 5:
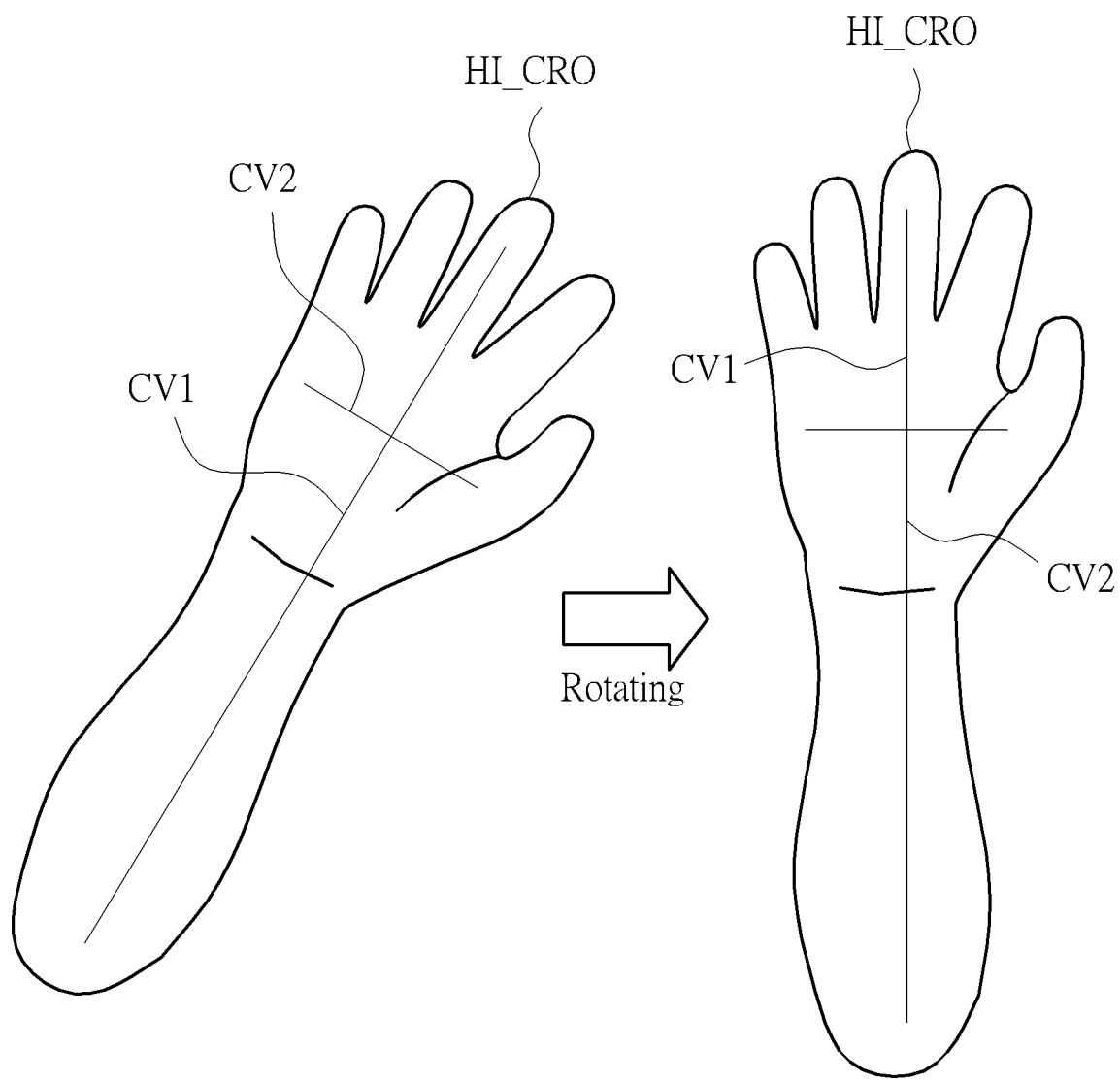
FIG. 5 is a schematic diagram of a hand image according to another embodiment of the present invention.

Please note that, the above embodiments determines whether the gesture of the user is the grabbing gesture according to the hand coordinates and the hand area sequentially acquired, so as to control the electronic device coupled to the gesture recognition module. According to different applications, those skilled in the art may observe appropriate alternations and modifications. For example, when the hand of the user is askew with respect to the horizontal plane, the detecting unit 100 can rotate the hand images according to the characteristic vectors while acquiring the hand images. Please refer to FIG. 5, which is a schematic diagram of a hand image HI_CRO according to an embodiment of the present invention. As shown in FIG. 5, the detecting unit 100 acquires characteristic vectors CV1, CV2, which are orthogonal to each other, in the hand image HI_CRO. The length of the characteristic vector CV1 is greater than that of the characteristic vector CV2. The detecting unit 100 then rotates the hand image HI_CRO according to the characteristic vector CV1 until the characteristic vector CV1 is perpendicular to a horizontal plane. As a result, the detecting unit 100 restores the hand image HI_CRO to the perpendicular.

When the gesture recognition module 10 determines the gesture of the user is the grabbing gesture according to the coordinates HC_1, HC_2 and the areas HA_1, HA_2, the computing 102 may calculate a dragging ratio TR1 according to a ratio between the area HA_2 and the Z-axis coordinate Z_HC_2 of the coordinate HC_2. The detecting unit 100 further acquires a coordinate HC_3 and the computing unit 102 acquires an area HA_3 according to the coordinate HC_3. Via calculating a ratio between the area HA_3 and a Z-axis coordinate Z_HC_3 of the coordinate HC_3, the computing unit 102 acquires a dragging ratio TR2. After acquiring the dragging ratios TR1, TR2, the determining unit 104 determines whether the user continues to make the grabbing gesture according to the dragging ratios TR1, TR2. When a difference between the dragging ratios TR1, TR2 is smaller than a dragging ratio TH_T, the determining unit 104 determines the user continues performing the grabbing gesture. When the difference between the dragging ratios TR1, TR2 is smaller than the dragging ratio TH_T, the determining unit 104 determines the user performs a dragging gesture. The grabbing gesture and the dragging gesture may correspond to specific functions of the electronic device coupled to the gesture recognition module 10. For example, the gesture recognition module 10 may couples to an electronic device with a display device. The electronic device 10 controls a cursor displayed on the display device according to the coordinates (e.g. coordinates HC_1-HC_3) generated by the gesture recognition module 10. When the gesture module 10 determines the user makes the grabbing gesture according to the coordinates HC_1, HC_2 and the areas HA_1, HA_2, the gesture recognition module 10 controls the electronic device to perform a click operation at the position pointed to by the cursor. Next, when the gesture recognition module 10 determines the user performs the dragging gesture according to the relation between the dragging ratios TR1, TR2, the gesture recognition module 10 controls the electronic device to maintain the click operation and to move the cursor according to the relation between the coordinates HC_2, HC_3.

Figure 6:
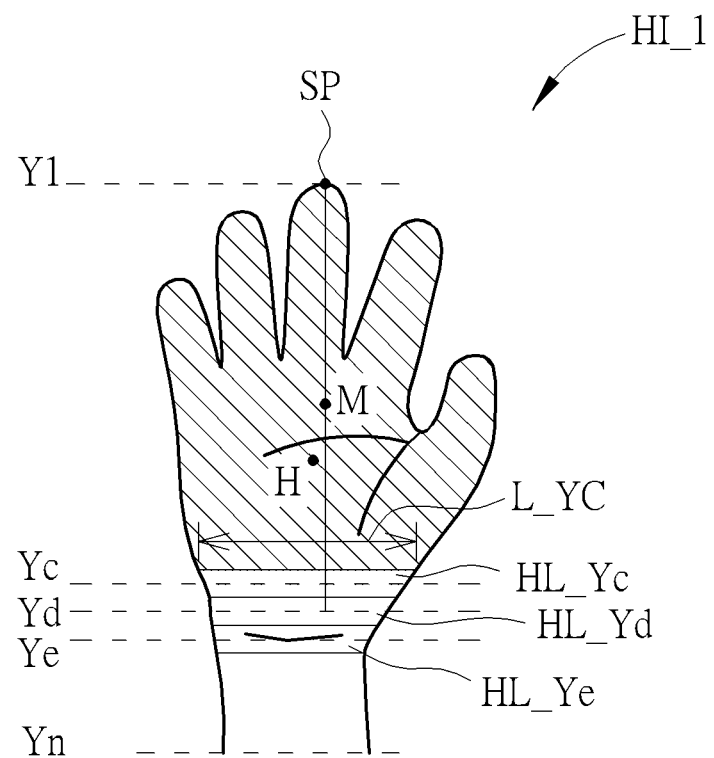
FIG. 6 is a schematic diagram of a hand image according to another embodiment of the present invention.

According to different applications, the method of the detecting unit 100 generating the coordinates of the hand can be appropriately modified. Please refer to FIG. 6, which is a schematic diagram of the hand image HI_1 according to an embodiment of the present invention. As shown in FIG. 6, the hand image HI_1 is located between the Y-axis coordinates Y1-Yn. The detecting unit 100 acquires horizontal lines HL_Y1-HL_Yn corresponding to the Y-axis coordinates Y1-Yn, respectively, and lengths L_$Y_1$-L_Yn of the horizontal lines HL_Y1-HL_Yn, wherein if a single Y-axis coordinate corresponds to a plurality of horizontal lines, the detecting unit 100 selects the horizontal line having the maximum length as the horizontal line corresponding to the single Y-axis coordinate. The detecting unit 100 compares lengths corresponding to three contiguous Y-axis coordinates among the Y-axis coordinates Y1-Yn, for acquiring a junction between the palm and the wrist in the hand image HI_1. When a length L_Yc (corresponding to a Y-axis coordinate Yc) is greater than a length L_Yd (corresponding to a Y-axis coordinate Yd) by a length threshold TH_L2 and the length L_Yd is smaller than or equal to a length L_Ye (corresponding to a Y-axis coordinate Ye) (i.e. L_Yc>L_Yd+TH_L2 and L_Yd≤L_Ye), the detecting unit 100 learns that the width variation between the Y-axis coordinate Yc and the Y-axis coordinate Yd is greater than the length threshold TH_L2, and that the width from the Y-axis coordinate Yd to the Y-axis coordinate Ye is slightly greater or remains the same. In such a condition, the detecting unit 100 determines the Y-axis coordinate Yd as the junction between the palm and the wrist in the hand image HI_1, defines the Y-axis coordinate Yd as a turning vertical coordinate TY and defines the pixel corresponding to the maximum Y-axis coordinate Y1 as the start pixel SP. The detecting unit 100 then builds a virtual perpendicular line between the start pixel SP and the horizontal line HL_Yd and acquires a middle point M of the virtual perpendicular line as the coordinate HC_1. Or, the detecting unit 100 calculates a barycentre of the pixel area located between the Y-axis coordinates Y1-Yd (i.e. the hatched area in FIG. 6) as the coordinate HC_1.

Figure 7:
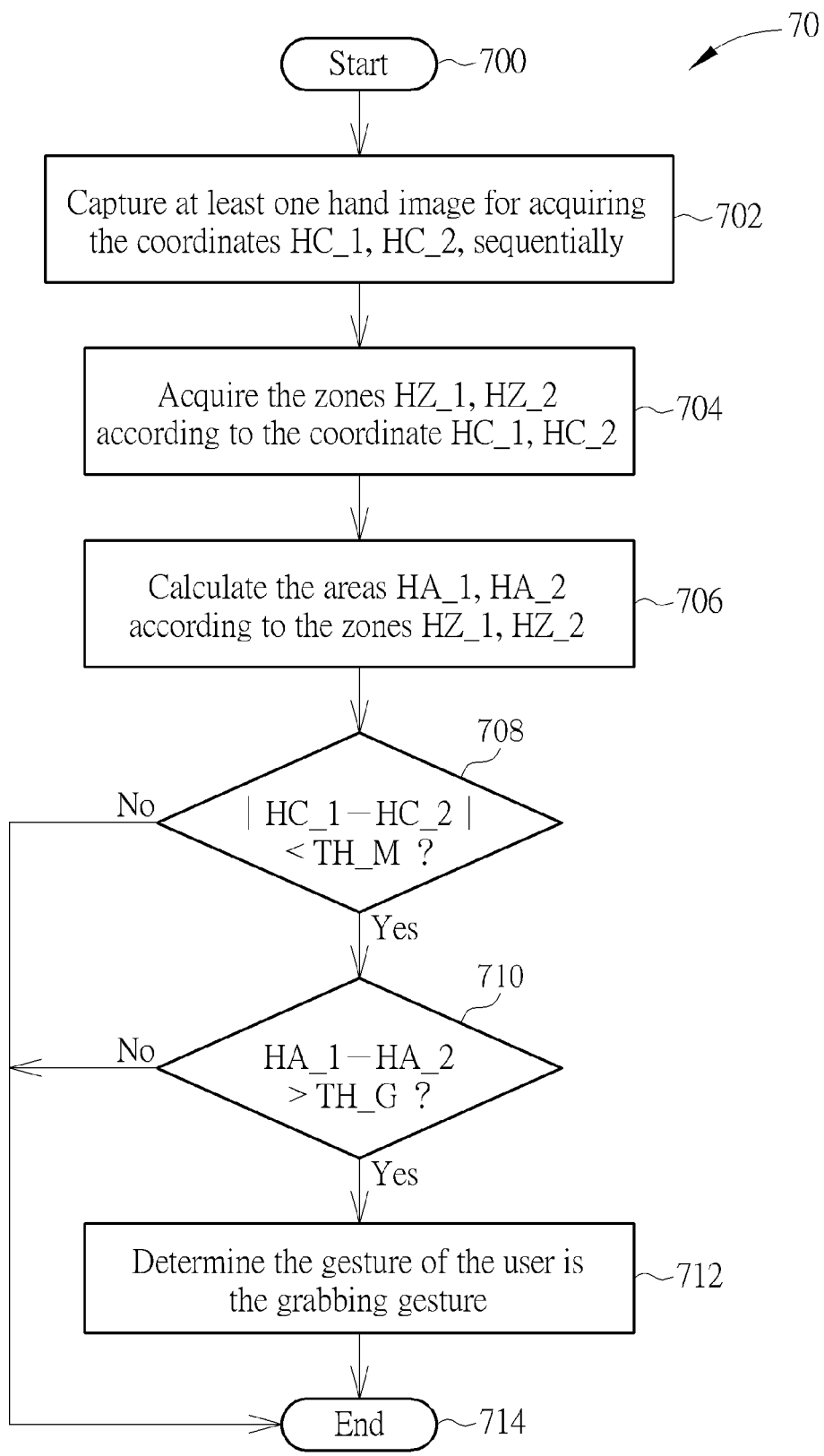
FIG. 7 is a flowchart of a gesture recognition method according to an embodiment of the present invention.

The method of the gesture recognition module 10 determining the gesture of the user can be summarized by a gesture recognition method 70, as shown in FIG. 7. Please note that, if a similar result can be obtained, the sequence of the gesture recognition method 70 is not limited to that illustrated in FIG. 7. The gesture recognition method 70 is utilized in a gesture recognition module and comprises the following steps:

Step 700: Start.

Step 702: Capture at least one hand image for acquiring the coordinates HC_1, HC_2, sequentially.

Step 704: Acquire the zones HZ_1, HZ_2 according to the coordinate HC_1, HC_2.

Step 706: Calculate the areas HA_1, HA_2 according to the zones HZ_1, HZ_2.

Step 708: Determine whether the distance between the coordinates HC_1, HC_2 is smaller than the moving threshold TH_M. If yes, perform step 710; otherwise, perform step 714.

Step 710: Determine whether the difference between the areas HA_1, HA_2 is greater than the grabbing threshold TH_G. If yes, perform step 712; otherwise, perform step 714.

Step 712: Determine the gesture of the user is the grabbing gesture.

Step 714: End.

According to the gesture recognition method 70, the area variation of the hand in the captured 3D image can be utilized as the references of determining the gesture of the user, so as to determine whether the user makes the grabbing gesture.

The detailed operations of the gesture recognition method 70 can be known by referring to the above, and are therefore not narrated herein for brevity.

To sum up, the gesture recognition module and the gesture recognition method of the above embodiments determines whether the gesture of the user is the grabbing gesture according to the area variation of the hand in the captured 3D images. The gesture recognition module and the gesture recognition method of the above embodiments therefore utilize the depth information of the 3D images to further increase the accuracy of recognizing the gesture of the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gesture recognition module, for recognizing a gesture of a user, the gesture recognition module comprising:
    a detecting unit, for capturing at least one hand image of a hand of the user, so as to sequentially acquire a first coordinate and a second coordinate;
    a computing unit coupled to the detecting unit, the computing unit for defining a first zone and a second zone according to the first coordinate and the second coordinate, respectively, and calculating a first area and a second area according to the first zone and the second zone; and
    a determining unit coupled to the detecting unit and the computing unit, the determining unit for recognizing the gesture according to the first coordinate, the second coordinate, the first area and the second area
    wherein after the computing unit acquires a minimum depth coordinate among a plurality of pixel areas in the first zone as a hand start depth coordinate, the computing unit adds the hand start depth coordinate and a depth for acquiring a hand end depth coordinate and accumulates a plurality of pixel areas between the hand start depth coordinate and the hand end depth coordinate for generating the first area.

2. The gesture recognition module of claim 1, wherein the detecting unit further captures at least one 3D image and at least one 2D image of a face of the user, for detecting a face coordinate; the detecting unit acquires a hand image start depth coordinate via subtracting a first depth from a face depth coordinate of the face coordinate and acquires a hand image end depth coordinate via subtracting a second depth from the face depth coordinate; and the detecting unit detects a plurality of pixel areas corresponding to a plurality of depth coordinates between the hand image start depth coordinate and the hand image end depth coordinate for generating the hand images.

3. The gesture recognition module of claim 2, wherein the detecting unit selects a pixel area with the greatest area among the plurality of pixel areas as the hand image, wherein the area of the pixel area is greater than an area threshold.

4. The gesture recognition module of claim 1, wherein the detecting unit acquires a first characteristic vector and a second characteristic vector of a first hand image according to the first hand image, wherein the first characteristic vector is orthogonal to the second characteristic vector and a length of the first characteristic vector is greater than a length of the second vector; and the detecting unit rotates the first hand image according to the first vector for restoring the first vector to be perpendicular to a horizontal area of the first hand image.

5. The gesture recognition module of claim 1, wherein the detecting unit calculates lengths of a plurality of horizontal lines corresponding to a plurality of vertical coordinates in a first hand image of the hand images according to the first hand image; and when a difference between the length of a horizontal line of the plurality of horizontal lines corresponding to a first vertical coordinate and the length of a horizontal line of the plurality of horizontal lines corresponding to a second vertical coordinate is greater than a length threshold, the detecting unit acquires the first vertical coordinate as a hand vertical coordinate of the first coordinate, acquires a horizontal coordinate of a middle point of the horizontal line corresponding to the first vertical coordinate as a hand horizontal coordinate of the first coordinate and acquires a depth coordinate of the first hand image as a hand depth coordinate of the first coordinate; wherein the first vertical coordinate and the second vertical coordinate are contiguous vertical coordinates.

6. The gesture recognition module of claim 1, wherein the detecting unit calculates lengths of a plurality of horizontal line corresponding to a plurality of vertical coordinates in a first hand image according to the first hand image; and
    when a difference between the length of a horizontal line of the plurality of horizontal lines corresponding to a first vertical coordinate and the length of a horizontal line corresponding of the plurality of horizontal lines to a second vertical coordinate is greater than a length threshold and the length of the horizontal line of the plurality of horizontal lines corresponding to the second vertical coordinate is smaller than or equal to a length of the horizontal line of the plurality of horizontal lines corresponding to a third vertical coordinate, the detecting unit defines the second vertical coordinate as a turning vertical coordinate and defines a pixel with the highest vertical coordinate in the first hand image as a start pixel; and the detecting unit generates the first coordinate according to the start pixel and the turning vertical coordinate; wherein the first vertical coordinate, the second vertical coordinate and the third vertical coordinate are contiguous vertical coordinates.

7. The gesture recognition module of claim 6, wherein the detecting unit calculates a middle point of a virtual vertical line between the start pixel and the horizontal line corresponding to the turning vertical coordinate, for acquiring a vertical coordinate and a horizontal coordinate of the middle point as a hand vertical coordinate and a hand horizontal coordinate of the first coordinate, respectively, and acquiring a depth coordinate of the first hand image as a hand depth coordinate of the first coordinate.

8. The gesture recognition module of claim 6, wherein the detecting unit calculates a barycentre of a pixel area located between the vertical coordinate of the start pixel and the turning vertical coordinate in the first hand image, for acquiring a vertical coordinate and a horizontal coordinate of the barycentre as a hand vertical coordinate and a hand horizontal coordinate of the first coordinate, respectively, and acquires a depth coordinate of the first hand image as a hand depth coordinate of the first coordinate.

9. The gesture recognition module of claim 1, wherein a volume of the first zone is inversely proportional to a hand depth coordinate of the first coordinate.

10. The gesture recognition module of claim 1, wherein when a distance between the first coordinate and the second coordinate is smaller than a moving threshold and the difference between the first area and the second area is greater than a grabbing threshold, the determining unit determines the gesture is a grabbing gesture.

11. The gesture recognition module of claim 10, wherein when the determining unit determines the gesture is the grabbing gesture, the computing unit acquires a first dragging ratio according to the second area and the hand depth coordinate of the second coordinate; acquires a third coordinate; acquires a third area according to the third coordinate; acquires a second dragging ratio according to the third area and the hand depth coordinate of the third coordinate; and determines the user performs a dragging gesture when a difference between the first dragging ratio and the second dragging ratio is smaller than a dragging threshold.

12. A gesture recognition method for a gesture recognition module, the gesture recognition method comprising:
   capturing at least one hand image of a hand of a user, to sequentially acquire a first coordinate and a second coordinate;
   defining a first zone and a second zone according to the first coordinate and the second coordinate;
   calculating a first area and a second area according to the first zone and the second zone; and
   recognizing the gesture according to the first coordinate, the second coordinate, the first area and the second area;
   wherein the step of calculating the first area and the second area according to the first zone and the second zone comprises:
      acquiring a minimum depth coordinate among a plurality of pixel areas in the first zone as a hand start depth coordinate,
      adding the hand start depth coordinate and a depth for acquiring a hand end depth coordinate; and
      accumulating a plurality of pixel areas between the hand start depth coordinate and the hand end depth coordinate for generating the first area.

13. The gesture recognition method of claim 12, wherein the step of capturing at least one hand image of the hand of the user to sequentially acquire the first coordinate and the second coordinate comprises:
   capturing at least one 3D image and at least one 2D image of the user's face, for detecting a face coordinate;
   acquiring a hand image start depth coordinate via subtracting a first depth from a face depth coordinate of the face coordinate and acquiring a hand image end depth coordinate via subtracting a second depth from the face depth coordinate; and
   detecting a plurality of pixel areas corresponding to a plurality of depth coordinates between the hand image start depth coordinate and the hand image end depth coordinate for generating the hand images.

14. The gesture recognition method of claim 13, wherein the step of detecting the plurality of pixel areas corresponding to the plurality of depth coordinates between the hand image start depth coordinate and the hand image end depth coordinate for generating the hand images comprises:
   selecting a pixel area with the greatest area among the plurality of pixel areas as the hand image, wherein the area of the pixel area is greater than an area threshold.

15. The gesture recognition method of claim 12, wherein the step of capturing the hand image of the hand of the user further comprises:
   acquiring a first characteristic vector and a second characteristic vector of a first hand image according to the first hand image, wherein the first characteristic vector is orthogonal to the second characteristic vector and a length of the first characteristic vector is greater than a length of the second vector; and
   rotating the first hand image according to the first vector for restoring the first vector to be perpendicular to a horizontal area of the first hand image.

16. The gesture recognition method of claim 12, wherein the step of capturing at least one hand image of the hand of the user, to sequentially acquire the first coordinate and the second coordinate comprises:
   calculating lengths of a plurality of horizontal line corresponding to a plurality of vertical coordinates in a first hand image of the hand images according to the first hand image; and
   acquiring a first vertical coordinate as a hand vertical coordinate of the first coordinate, acquiring a horizontal coordinate of a middle point of a horizontal line corresponding to the first vertical coordinate as a hand horizontal coordinate of the first coordinate and acquiring a depth coordinate of the first hand image as a hand depth coordinate of the first coordinate when a difference between the length of a horizontal line of the plurality of horizontal lines corresponding to the first vertical coordinate and the length of a horizontal line of the plurality of horizontal lines corresponding to a second vertical coordinate is greater than a length threshold;
   wherein the first vertical coordinate and the second vertical coordinate are contiguous vertical coordinates.

17. The gesture recognition method of claim 12, wherein the step of capturing at least one hand image of the hand of the user, to sequentially acquire the first coordinate and the second coordinate comprises:
   calculating lengths of a plurality of horizontal line corresponding to a plurality of vertical coordinates in a first hand image according to the first hand image;
   when a difference between the length of a horizontal line of the plurality of horizontal lines corresponding to a first vertical coordinate and the length of a horizontal line of the plurality of horizontal lines corresponding to a second vertical coordinate is greater than a length threshold and the length of the horizontal line of the plurality of horizontal lines corresponding to the second vertical coordinate is smaller than or equal to the length of a horizontal line of the plurality of horizontal lines corresponding to a third vertical coordinate, defining the second vertical coordinate as a turning vertical coordinate and defining a pixel with the highest vertical coordinate in the first hand image as a start pixel; and
   generating the first coordinate according to the start pixel and the turning vertical coordinate;
   wherein the first vertical coordinate, the second vertical coordinate and the third vertical coordinate are contiguous vertical coordinates.

18. The gesture recognition method of claim 17, wherein the step of generating the first coordinate according to the start pixel and the turning vertical coordinate comprises:
   calculating a middle point of a virtual vertical line between the start pixel and the horizontal line corresponding to the turning vertical coordinate, for acquiring a vertical coordinate and a horizontal coordinate of the middle point as a hand vertical coordinate and a hand horizontal coordinate of the first coordinate, respectively; and
   acquiring a depth coordinate of the first hand image as a hand depth coordinate of the first coordinate.

19. The gesture recognition method of claim 17, wherein the step of generating the first coordinate according to the start pixel and the turning vertical coordinate comprises:
   calculating a barycentre of a pixel area located between the vertical coordinate of the start pixel and the turning vertical coordinate in the first hand image, for acquiring a vertical coordinate and a horizontal coordinate of the barycentre as a hand vertical coordinate and a hand horizontal coordinate of the first coordinate, respectively; and acquiring a depth coordinate of the first hand image as a hand depth coordinate of the first coordinate.

20. The gesture recognition method of claim 12, wherein a volume of the first zone is inversely proportional to a hand depth coordinate of the first coordinate.

21. The gesture recognition method of claim 12, wherein the step of recognizing the gesture according to the first coordinate, the second coordinate, the first area and the second area comprises:

determining the gesture is a grabbing gesture when a distance between the first coordinate and the second coordinate is smaller than a moving threshold and the difference between the first area and the second area is greater than a grabbing threshold.

22. The gesture recognition method of claim 21, wherein the step of determining the gesture is a grabbing gesture when a distance between the first coordinate and the second coordinate is smaller than a moving threshold and the difference between the first area and the second area is greater than a grabbing threshold further comprises:

acquiring a first dragging ratio according to the second area and the hand depth coordinate of the second coordinate when determining the gesture is the grabbing gesture;

acquiring a third coordinate;

acquiring a third area according to the third coordinate;

acquiring a second dragging ratio according to the third area and the hand depth coordinate of the third coordinate; and determining the user performs a dragging gesture when a difference between the first dragging ratio and the second dragging ratio is smaller than a dragging threshold.

* * * * *